United States Patent
Shimaguchi

(10) Patent No.: US 12,227,675 B2
(45) Date of Patent: Feb. 18, 2025

(54) UV CURABLE COMPOSITION, AND UV CURABLE SHEET USING SAME

(71) Applicant: SOMAR CORPORATION, Tokyo (JP)

(72) Inventor: Ryusuke Shimaguchi, Tokyo (JP)

(73) Assignee: SOMAR CORPORATION, Tokyo (JP)

(*) Notice: Subject to any disclaimer, the term of this patent is extended or adjusted under 35 U.S.C. 154(b) by 181 days.

(21) Appl. No.: 17/764,156

(22) PCT Filed: Sep. 25, 2020

(86) PCT No.: PCT/JP2020/036206
§ 371 (c)(1),
(2) Date: Mar. 25, 2022

(87) PCT Pub. No.: WO2021/060446
PCT Pub. Date: Apr. 1, 2021

(65) Prior Publication Data
US 2022/0325144 A1  Oct. 13, 2022

(30) Foreign Application Priority Data
Sep. 27, 2019 (JP) .................. 2019-177651

(51) Int. Cl.
*C09J 109/06* (2006.01)
*C09J 7/10* (2018.01)
(Continued)

(52) U.S. Cl.
CPC .............. *C09J 109/06* (2013.01); *C09J 7/10* (2018.01); *C09J 7/383* (2018.01); *C09J 109/00* (2013.01);
(Continued)

(58) Field of Classification Search
CPC .. C09J 7/383; C09J 2301/416; C09J 2409/00; C09J 109/00; C09J 109/06
See application file for complete search history.

(56) References Cited

U.S. PATENT DOCUMENTS 4,152,231 A * 5/1979 St. Clair ................ C08K 5/103
522/112
5,536,621 A 7/1996 Mori et al.
(Continued)

FOREIGN PATENT DOCUMENTS

| CN | 104797669 A | 7/2015 |
|---|---|---|
| JP | 62187744 A | 8/1987 |

(Continued)

OTHER PUBLICATIONS

Japanese First Office Action mailed Jan. 31, 2023 in counterpart Japanese application JP2021-549027, 9 pages in Japanese.
(Continued)

*Primary Examiner* — Jasper Saberi
(74) *Attorney, Agent, or Firm* — Juan Carlos A. Marquez; Marquez IP Law Office, PLLC

(57) ABSTRACT

Provided are a UV curable composition which can be cured without undergoing a high-temperature heating step and has excellent adhesiveness and mechanical strength; and a sheet using the same. This UV curable composition includes a rubber component having a diene skeleton, a photopolymerization initiator, and a cross-linking agent, wherein the rubber component having a diene skeleton contains a solid rubber component and a liquid rubber component at 25° C. The UV curable composition can be cured by UV irradiation in a short time, and can thus be applied to not only an adherend having high heat resistance but also a wide range of members.

10 Claims, 1 Drawing Sheet

(51) Int. Cl.
*C09J 7/38* (2018.01)
*C09J 109/00* (2006.01)

(52) U.S. Cl.
CPC .... *C09J 2301/408* (2020.08); *C09J 2301/416* (2020.08); *C09J 2409/00* (2013.01)

(56) References Cited

U.S. PATENT DOCUMENTS

| | | | |
|---|---|---|---|
| 2005/0165164 A1* | 7/2005 | Moeller | C09J 121/00 525/66 |
| 2013/0148330 A1* | 6/2013 | Kim | G09F 13/04 524/521 |
| 2015/0307750 A1* | 10/2015 | Nishijima | C09J 7/383 428/335 |

FOREIGN PATENT DOCUMENTS

| | | |
|---|---|---|
| JP | 2010115792 A | 5/2010 |
| JP | 2010150432 A | 7/2010 |
| JP | 2010209295 A | 9/2010 |
| JP | 2019099622 A | 6/2019 |
| WO | 2007091476 A1 | 8/2007 |
| WO | 2014084351 A1 | 6/2014 |

OTHER PUBLICATIONS

Japanese First Office Action mailed Jan. 31, 2023 in counterpart Japanese application JP2021-549027, 9 pages in English.
"Modern Adhesion Technical Manual," East et al., 1st edition, pp. 442-443, 1 page in Chinese, 2 pages in English.
Practical Adhesion Handbook, East, 1st edition, p. 337, Shanghai Scientific Technology Publishing, 2 pages in Chinese, 2 pages in English.
PCT International Search Report mailed Nov. 10, 2020, in counterpart PCT Application PCTJP/2020036206,6 pages.
Chinese First Office Action mailed Aug. 31, 2023 in counterpart Chinese application CN202080067544.3, 10 pages in Chinese.
Chinese First Office Action mailed Aug. 31, 2023 in counterpart Chinese application CN202080067544.3, 12 pages in English.
"Modern Adhesion Technical Manual," East et al., 1st edition, pp. 442-443, 1 page in Chinese, 2 pages in English, Jan. 31, 2002.
Practical Adhesion Handbook, East, 1st edition, p. 337, Shanghai Scientific Technology Publishing, 2 pages in Chinese, 2 pages in English, Mar. 31, 1998.

* cited by examiner

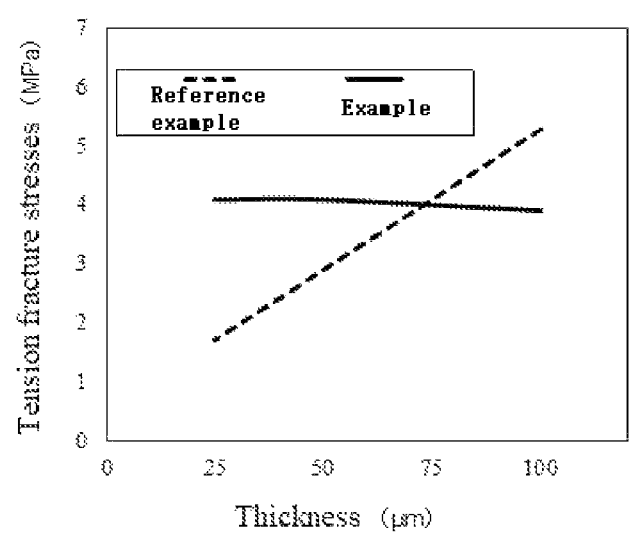

UV CURABLE COMPOSITION, AND UV CURABLE SHEET USING SAME

This application is a national stage application filed under 35 U.S.C 371 of International Application No. PCT/JP/2020/036206 filed Sep. 25, 2020, which claims priority to Japanese Application No. JP 2019177651 filed on Sep. 27, 2019. The disclosures of the above applications are incorporated herein by reference in their entireties.

TECHNICAL FIELD

The present invention relates to a UV (ultraviolet) curable composition and a UV curable sheet, particularly to a UV curable resin composition and a UV curable sheet which are used for adhesive sheets, stretchable sheets, and the like.

BACKGROUND

When a material is bonded with another material, their bonding interface often receives a stress caused by heat shrinkage, deformation vibration, and the like. The stress is gradually accumulated on the bonding interface until the bonding interface is damaged at certain time points. Especially, when different types of materials are bonded, warping, wrinkling or material damage are caused by combination of materials.

Examples of methods for alleviating these stresses can include methods for using soft components such as plasticizers in an adhesive. Softening the adhesive material layer means inducing plastic deformation. The plastic deformation of the adhesive material layer causes deformation of the materials, and the destruction between the materials and the adhesive material layer are prevented. However, once the deformed material is to be restored, a stress generated by the deformation of the adhesive material layer is accumulated in the adhesive material layer or the bonding interface as an internal stress, and then a risk that the materials are damaged caused by reduction in a cohesive force is triggered.

Patent document 1 discloses an adhesive composition, comprising (A) a rubber component with a diene skeleton, (B) a monomer and/or oligomer with 6 or more ethylenically unsaturated groups and (C) a radical initiator consisting of organic peroxide. The Patent document 1 describes an adhesive composition and an adhesive sheet using the same, the adhesive composition comprising a rubber and has an excellent adhering force, and can sufficiently prevent and reduce the warping and wrinkling.

However, since the adhesive composition in Patent document 1 uses organic peroxide being a thermal radical initiator as a radical source, the thermal curing process needs about 180° C. for heating, A heating process of about 180° C. is needed for its thermal curing, and there is room for improvement in the aspect of adherends with low thermal resistance, which is difficultly applied.

Patent document 2 discloses a manufacturing method of a cross-linked rubber, wherein a conjugated diene-based uncross-linked rubber having an unsaturated bond is cross-linked by irradiation of active light rays in the presence of a photopolymerization initiator. Then, this patent document also describes that a thin film with even thickness can be easily obtained by this manufacturing method, with good production efficiency, the obtained cross-linked rubber has more excellent heat resistance and other properties compared with uncross-linked rubbers and can be used as an adhesive and the like.

Through the method described in Patent document 2, a cured product can be obtained at a low temperature in a short time. Therefore, the cured product can be applied to adherends with low heat resistance without going through the heating process. However, the cross-linked rubber obtained by this method cannot be sufficiently bonded with the adherends.

PRIOR ART DOCUMENTS

Patent Documents

[Patent document 1] Japanese Patent Application Laid-Open No. 2017-193658
[Patent document 2] Japanese Patent Application Laid-Open No. 2010-180370

SUMMARY

The Problem to be Solved by the Present Invention

In view of this, the objective of the present invention is to provide a UV curable composition that can be cured without going through a high-temperature heating process and has excellent adhesiveness (adhering force), and a UV curable sheet using the same.

Means to Solve the Problem

As a result of deep research on the above subject, the inventor found out that the above problem can be solved through combined use (joint use) of a solid rubber component and a liquid rubber component at 25° C. as a rubber component in a UV curable composition comprising the rubber component with a diene skeleton, a photopolymerization initiator and a crosslinker, and thus has completed the present invention. That is to say, the adhesive composition of the present invention is the UV curable composition which comprises the rubber component with the diene skeleton, the photopolymerization initiator and the crosslinker. The above rubber component with the diene skeleton comprises the solid rubber component and the liquid rubber component at 25° C.

At least one of the above solid rubber components or the above liquid rubber components preferably contains a modified rubber comprising at least one selected from a modified butadiene rubber, a modified styrene-butadiene rubber and a modified isoprene rubber.

In addition, the above modified rubber preferably contains a modified rubber modified with at least one selected from a carboxy group, an acid anhydride group, an amino group, an alkoxysilyl group, a hydroxyl group and an epoxy group.

Further, the above modified rubber is preferably the liquid rubber component at 25° C.

The blending amount of the above liquid rubber is preferably 3-50 mass % relative to the total amount of the rubber component.

In addition, the above solid rubber component comprises at least one selected from a butadiene rubber and a styrene-butadiene rubber.

The present invention provides a UV curable sheet, comprising an adhesive layer which is formed by the above any UV curable composition.

The thickness of the above adhesive layer is preferably 5-200 μm.

In addition, the 90-degree peel strength of the above UV curable sheet based on JISK-6854 after irradiation of UV with a cumulative light amount of 1600 mJ/cm² (millijoule/square centimeter) through a high-pressure mercury lamp at room temperature is preferably 4 N/inch (Newton/inch) or more.

A cured product of the above UV curable composition or the UV curable sheet can be properly used. The gel fraction of the above cured product is preferably 50% or more.

In addition, a UV curable sheet in one embodiment of the present invention is the UV curable sheet comprising the rubber component with the diene skeleton. When the thickness of the sheet is 25 μm-50 μm, the tensile strength at cutting of the UV curable sheet based on JISK-6251 after irradiation of UV with a cumulative light amount of 1600 mJ/cm² through the high-pressure mercury lamp at room temperature is 3.5 MPa (megapascals) or more.

The Effects of the Present Invention

Since the UV curable composition of the present invention can be cured by UV irradiation in a short time, it can be applied not only to adherends with high heat resistance but also to various parts. The cured product obtained from the UV curable composition of the present invention has excellent adhesiveness while being uniform and having high mechanical strength even if it is thinned. Therefore, the obtained cured product can be suitably used not only as an adhesive sheet but also as a stretchable sheet.

BRIEF SPECIFICATION OF THE DRAWINGS

FIG. 1 is a graph showing a relationship between thicknesses and tension fracture stresses of samples in examples and reference examples.

SPECIFICATION OF THE EMBODIMENTS

Next, embodiments of the present invention will be described in detail.

It is noted that in this specification, "-" representing a numerical value range represents a range of numerical value which respectively serve as an upper limit value and a lower limit value. In addition, in the case that only the upper limit value describes a unit within the numerical value range, the unit of the lower limit value is the same as that of the upper limit value.

In the numerical value range described in stages in this specification, the upper limit value or the lower limit value described in a certain numerical value range can be replaced as upper limit values or lower limit values of other numerical value ranges described in stages.

In addition, in the numerical value range described in this specification, the upper limit value or the lower limit value described in a certain numerical value range can be replaced as values as shown in examples.

When there are multiple substances belonging to each component in the composition, unless otherwise specified in this specification, the content rate or content of each component in the composition refer to the total content rate or content of multiple substances in the composition.

The UV curable composition of the present invention comprises a rubber component with a diene skeleton, a photopolymerization initiator and a crosslinker. The above rubber component with the diene skeleton comprises a solid rubber component and a liquid rubber component at 25° C.

Generally, the radical polymerized adhesive composition needs the heating process due to use of the thermal radical initiator as a radical source. The adhesive composition softened by this heating process enters the uneven parts of the surface of the adherend, and obtains excellent adhesiveness through an anchoring effect.

In contrast, since the UV curable composition is cured through UV irradiation using a photo-radical initiator as a radical source, a cured product can be obtained in a short time without going through the heating process. However, since the previous UV curable compositions do not undergo the heating process, the anchoring effect is difficultly formed, and sufficient adhesiveness cannot be obtained.

It is found that the adhesiveness with adherends can be improved without the heating process through combined use of the solid rubber component and the liquid rubber component at 25° C. as the rubber component with the diene skeleton, and thus the present invention was completed. Further, by using the UV curable composition of the present invention, an uniform sheet having high mechanical strength can be obtained even if it is thinned.

Next, the components contained in the UV curable composition of the present invention will be illustrated.

(A) The Rubber Component with the Diene Skeleton

The UV curable composition of the present invention comprises the rubber component with the diene skeleton (hereinafter also referred to as "(A) component"). Therefore, after being cured via UV irradiation, the component (A) is crosslinked and has rubber elasticity. As a result, the cured resin composition can alleviate stress concentration caused by thermal shrinkage and thermal shock, and sufficiently prevent and reduce warping and wrinkling.

It is noted that in the present invention, (A-1) a solid rubber component at 25° C. (hereinafter also referred to as "solid rubber component") and (A-2) a liquid rubber component at 25° C. (hereinafter also referred to as "liquid rubber component") are included as (A) a component. Next, each component will be explained.

(A-1) Solid Rubber Component

Examples of solid rubber components can include for example a butadiene rubber (BR), a styrene-butadiene rubber (SBR), an acrylonitrile-butadiene rubber (NBR), an isoprene rubber (IR), a chloroprene rubber (CR), a butyl rubber (IIR) and a natural rubber (NR), or a modified rubber such as modified BR, modified SBR, modified IR, modified NBR, modified CR, modified IIR and modified NR in which functional groups are introduced. Among them, BR, SBR, modified BR and modified SBR are preferred by considering from the viewpoints of solvent solubility, adhesiveness and the like.

Examples of functional groups of the modified rubber can include for example an amino group, an alkoxysilyl group, a hydroxyl group, an epoxy group, a carboxy group, an acid anhydride group, and the like. The introduction positions of the functional groups are not especially limited, namely, monomers having functional groups are directly co-polymerized to be introduced into a polymer chain, or modified with a modifier to be introduced into the terminal end of the polymer, or introduced into the side chain of the polymer. It is noted that both a block copolymer and a random copolymer can be used as SBR or modified SBR. The lower limits of styrene contents of SBR and modified SBR are preferably 15 mass %, more preferably 18 mass %. The upper limits of styrene contents of SBR and modified SBR are preferably 60 mass %, more preferably 50 mass %. The lower limits of the vinyl contents of SBR and modified SBR are preferably 10 mass %. The upper limits of the vinyl contents of SBR and modified SBR are preferably 50 mass %. It is noted that the vinyl content refers to a content rate of 1,2-coalition in a butadiene monomer unit of a polymer chain. One solid rubber component can be used alone, or two or more solid rubber components can be used in combination.

The solid rubber component is not especially limited as long as it is a solid at 25° C. The Mooney viscosity is preferably 10-90, more preferably 20-60. By setting the Mooney viscosity 10 or more, the mechanical strength can be improved, and the effects of inhibiting bleeding and dripping during forming the sheets can be expected. On the other hand, by setting the Mooney viscosity 90 or less, the solubility to the solvent can be satisfied.

It is noted that, in this specification, the Mooney viscosity refers to a Mooney viscosity (Mooney viscosity ML1+4 (100° C.)) measured at 100° C., which is measured based on JIS K-6300-1:2013.

The Mooney viscosity is an index of industrial viscosity measured by a Mooney viscometer serving as a rotational plasticity meter. In ML1+4 (100° C.), M represents the Mooney viscosity, L represents a large rotor (L type), 1+4 refers to a value measured under the conditions that the preheating time is 1 min, the rotation time of the rotor is 4 min, and the temperature is 100° C. The Mooney viscosity can be controlled within the above-mentioned range by adjusting molecular weight, molecular weight distribution, styrene content and microstructures of the solid rubber component.

Preparation methods of modified rubbers are not especially limited. The modified rubber can be prepared by for example the following methods. Included are methods for introducing the above functional groups by respectively modifying BR, SBR, IR, NBR, CR and IIR synthesized by anionic polymerization or NR serving as a natural product, with a modifier, or methods for introducing the above functional groups onto the polymer chain by co-polymerizing monomers having the above functional groups with monomers constituting basic polymers.

(A-2) Liquid Rubber Component

The UV curable composition of the present invention is characterized by comprising the liquid rubber component in addition to the solid rubber component.

By the addition of the liquid rubber component, the adhesiveness of the cured product can be improved without the heating process. Further, more even sheet with high mechanical strength can also be obtained even if the film is thinned.

Here, a liquid means having fluidity at normal temperature and normal pressure (1 atm, 25° C.). Specifically, it means that when being inclined at 45°, the rubber component added into a container is deformed due to its shape being not maintained for 5 min or more.

Examples of the liquid rubber component can include BR, SBR, IR, NBR, CR, IIR, NR and the like, or modified rubbers in which functional groups are introduced, such as modified BR, modified SBR, modified IR, modified NBR, modified CR, modified IIR and modified NR. Among them, the modified rubbers are preferred. Through introduction of functional groups, the polarity is improved, and it can be expected to improve the adherence characteristics with the adherend.

Since the UV curable composition of the present invention comprises the liquid rubber component, it has excellent fluidity, and easily enters a recess on the surface of the adherend. Therefore, the UV curable composition can be tight with the concave-convex shape of the adherend and has excellent adhesiveness. It is further believed that by using the modified rubber in which the functional groups are introduced, the polar functional groups on the surface of the adherend interact with the functional groups of the modified rubber, and the adhesiveness with the adherend is further improved. It is noted that use of the solid rubber component as the modified rubber can similarly obtain the same effect. Of course, the solid modified rubber and the liquid modified rubber can be used in combination.

Examples of functional groups can include for example an amino group, an alkoxysilyl group, a hydroxyl group, an epoxy group, a carboxy group and an acid anhydride group.

If interaction with polar functional groups of adherends is considered, among them, the carboxy group and the acid anhydride group are preferred. Examples of modified rubbers having the carboxy group can include for example (i) a dicarboxylic acid monoester modified rubber composition formed by ring opening of the acid anhydride group of the rubber composition having the acid anhydride group with alcohol, or (ii) a dicarboxylic acid modified rubber composition obtained by hydrolyzing the acid anhydride group of the rubber composition having the acid anhydride group with water. Examples of rubber compositions having the acid anhydride group can include a maleic anhydride modified rubber composition. It is noted that in the introduction positions of the functional group are not especially limited, namely, the functional groups can be introduced by co-polymerizing the monomers having functional groups, introduced into the terminal end of the polymer by modifying with a modifier, or introduced into the side chain of the polymer. In addition, both a block copolymer and a random copolymer can be used as SBR or modified SBR. One liquid rubber component can be used alone, or two or more liquid rubber components can be used in combination.

The preparation methods of modified BR, modified SBR, modified IR, modified NBR, modified CR, modified IIR and modified NR are not especially limited, and the above modified rubbers can be prepared by using methods that are the same as preparation methods described in (A-1) solid rubber component.

The molecular weight of the liquid rubber component is not especially limited as long as the liquid rubber component has fluidity at 25° C., and a number average molecular weight is preferably 80,000 or less, more preferably 1,000-50,000, and further preferably 2,000-40,000.

Relative to the totality of the rubber component, that is, the total amount of the solid rubber component and the liquid rubber component, the lower limit of the content of the liquid rubber component is preferably 3 mass %, further preferably 8 mass %. On the other hand, relative to the totality of the rubber component, that is, the total amount of the solid rubber component and the liquid rubber component, the upper limit of the content of the liquid rubber component is preferably 50 mass %, further preferably 40 mass %.

By setting the content of the liquid rubber component as 3 mass % or more relative to the totality of the rubber component, that is, the total amount of the solid rubber component and the liquid rubber component, the fluidity of the resin is improved, and it can be expected that an effect that the adhesive with a substrate is improved.

On the other hand, by setting the content of the liquid rubber component as 50 mass % or less relative to the totality of the rubber component, that is, the total amount of the solid rubber component and the liquid rubber component, an effect of maintaining high mechanical strength can be expected.

It is noted that, by appropriately combining the known methods, it can be confirmed that the UV curable composition comprises the liquid rubber component. For example, after the U curable composition is extracted with a solvent, its extract can be evaluated by means of gel permeation chromatography (GPC), infrared spectroscopy (IR), nuclear magnetic resonance (NMR) or the like.

(B) Photopolymerization Initiator

Since the UV curable composition of the present invention comprises a photopolymerization initiator, it can be cured by UV irradiation in a short time. Therefore, the UV curable composition of the present invention does not need to be heated at a high temperature of about 180° C. like the adhesive composition containing organic peroxide as a thermal radical initiator, so it can be applied to more adherend materials.

Examples of photopolymerization initiators used in the UV curable composition of the present invention can include an alkylphenone type polymerization initiator, an acylphosphine oxide type photopolymerization initiator, a titanocene type compound, an oxime ester type compound, a benzoin type compound, an acetophenone type compound, a benzophenone type compound, a thioxanthone type compound, an α-acyl oxime ester type compound, a phenyl glyoxylic acid type compound, a benzyl type compound, an azo type compound, a diphenyl sulfide type compound, an organic pigment type compound, an iron phthalocyanine type compound, a benzoin ether type compound and an anthraquinone type compound.

One photopolymerization initiator can be used along, or two or more photopolymerization initiators can be used in combination.

Among them, starting from the viewpoint of reactivity, the alkylphenone type compound and the acylphosphine oxide type compound are preferred.

Examples of the alkylphenone type polymerization initiators can include α-amino alkylphenone type or benzyl methyl ketal type polymerization initiators, and specifically can include 2-methyl-1[4-(methylthio)phenyl]-2-morpholinopropane-1-one, 2-benzyl-2-dimethylamino1-(4-morpholinophenyl)butanone-1,2-methyl-1-[4-(methoxythio)-phenyl]-2-morpholinopropane-2-one, 2,2-dimethoxy-1,2-diphenylethane-1-one and 1-hydroxycyclohexyl phenyl ketone. They can be used alone or in combination.

Examples of the acylphosphine oxide type photopolymerization initiators include for example 2,4,6-trimethylbenzoyl-diphenylphosphine oxide, bis(2,4,6-trimethylbenzoyl)-phenyl phosphine oxide. They can be used alone or in combination.

Relative to the totality of the rubber component, that is, the total amount of the solid rubber component and the liquid rubber component, the content of the photopolymerization initiator is preferably 0.01 mass %-10 mass %, further preferably 0.1 mass %-5 mass %, more further preferably 0.5 mass %-3 mass %.

By setting the content of the photopolymerization initiator as 0.01 mass % or more relative to the totality of the rubber component, that is, the total amount of the solid rubber component and the liquid rubber component, the above rubber components are crosslinked with a low cumulative light amount.

On the other hand, by setting the content of the photopolymerization initiator as 10 mass or less relative to the totality of the rubber component, that is, the total amount of the solid rubber component and the liquid rubber component, the above rubber components are uniformly crosslinked in a film thickness direction.

By setting the content of the photopolymerization initiator as the above range, the UV curable composition is more efficiently cured, and the adhesiveness and the mechanical strength of the obtained cured product are further improved.

(C) Crosslinker

Since the UV curable composition of the present invention comprises (C) a crosslinker, the cohesive force of the cured product is improved, and the mechanical strength and adhesiveness of the cured sheet are improved.

The crosslinker can adopt for example a multi-functional (meth)acrylate having 2 or more, more preferably 3 or more and further preferably 6 or more ethylenically unsaturated groups. Specifically, examples of crosslinkers can include known polyester (meth)acrylate, polyether (meth)acrylate, epoxy (meth)acrylate, urethane (meth)acrylate and silicone (meth)acrylate, which have 2 or more ethylenically unsaturated groups. The multi-functional (meth)acrylate having 2 or more ethylenically unsaturated groups can be used alone, or 2 or more these multi-functional (methyl) acrylates having 2 or more ethylenically unsaturated groups can be used in combination. It is noted that (meth)acrylate refers to acrylate or methacrylate.

In the background art where the thermal radical initiator is used, the heating process of about 180° C. is needed. Therefore, when a crosslinker having 5 or less ethylenically unsaturated groups is used, the UV curable sheet satisfying the mechanical strength and adhesiveness cannot be obtained because the crosslinker is volatilized during the heating. In contrast, since a heat curing process is not needed in the present invention where UV curing is used, the crosslinker having 5 or less ethylenically unsaturated groups is not volatilized, and the UV curable sheet having excellent mechanical strength and adhesiveness can be obtained.

It is noted that the number of the ethylenically unsaturated groups of the crosslinker are preferably 15 or less, more preferably 10 or less. If the number of the ethylenically unsaturated groups is 15 or less, the functional groups sufficiently react when ultraviolet irradiation is conducted, so as to inhibit time-dependent reaction during the use, and therefore a UV-curable sheet having more excellent weather resistance can be obtained.

Relative to the totality of the rubber component, that is, the total amount of the solid rubber component and the liquid rubber component, the content of the crosslinker is preferably 0.1 mass %-100 mass %, more preferably 1 mass %-40 mass %. By setting the content of the crosslinker within the above-mentioned range, a UV curable composition and a UV curable sheet which have more excellent adhesiveness can be obtained.

In addition to the above-mentioned components, the UV curable composition of the present invention can also comprise various components as needed. These components will be described below.

(D) Tackifier

The UV curable composition of the present invention can comprise (D) a tackifier. By adding the tackifier, the adhering force after curing can be further improved. Moreover, tackiness can also be given to the UV curable composition by comprising the tackifier.

The tackifier can adopt a styrene resin, an xylene resin, a terpene resin, a phenolic resin, rosin, polymerized rosin, non-homogenized rosin and its derivatives, a polyterpene resin, phenol modified resins such as terpene phenol and rosin phenol modified resins, an alkyl phenolic resin, a coumarone-indene resin, an xylene resin, an aliphatic hydrocarbon resin, an alicyclic hydrocarbon resin, an aromatic hydrocarbon resin and their hydrogenated products, etc.

One tackifier can be used alone, or two or more tackifiers can be used in combination.

Relative to the totality of the rubber component, that is, the total amount of the solid rubber component and the liquid rubber component, the content of the tackifier is preferably 0.1 mass %-100 mass %, more preferably 1 mass %-50 mass %. By setting the content of the tackifier within the above range, the workability of the UV curable composition when not being cured and the adhesiveness of the UV curable composition after being cured can be further improved.

In the UV curable composition of the present invention, film-forming aids, various fillers, functional fillers, antioxidants, light stabilizers, colorants, flame retardants, antifoaming agents, leveling agents, lubricants, dispersants, processing aids, plasticizers, coupling agents and other previously known additives can also be further properly used.

Next, the UV curable sheet of the present invention will be described.

The UV curable sheet of the present invention has an adhesive layer formed by the above-mentioned UV curable composition. For the UV curable sheet of the present invention, the above-mentioned UV curable composition can be coated on the surface of the release film to form the adhesive layer, and then the adhesive layer can be peeled from the release film to only obtain the adhesive layer. In addition, the above-mentioned UV curable composition can be coated on the at least one surface of the substrate so that multiple adhesive layers are stacked. Hereinafter, the release film, the substrate, and the adhesive layer will be demonstrated.

The release film can adopt a polyethylene film, a polypropylene film, a polymethylpentene (TPX) film, a polyethylene film with a silicone release agent, a polypropylene film with a silicone release agent and a polyethylene terephthalate (PET) film with a silicone release agent, polyethylene resin coated paper, polypropylene resin coated paper and TRX resin coated paper, or the like. The thickness of the release film can be properly selected as needed. The thickness of the substrate of the film is preferably 12-250 μm, and the thickness of the substrate of paper is preferably 50-300 μm.

The substrate is not especially limited and can be properly selected according to the uses of the UV curable sheet. In particular, the substrate can adopt films containing synthesized resins such as polyethylene terephthalate, polyethylene naphthalate, polyethylene, polypropylene, polycarbonate, acrylic resin, triacetyl cellulose, cyclic olefin polymers, cyclic olefin copolymers, aramid, polyimide, polyamide, polyphenylene sulfide, polyetherimide, polyethersulfone, aromatic polyamide and polysulfone, nonwoven fabric, paper and the like. The thickness of the substrate is not especially limited, and can be properly selected according to uses.

The thickness of the adhesive layer can be properly set according to the uses of the UV curable sheet. The lower limit is preferably 5 μm, further preferably 10 μm. The upper limit is preferably 200 μm, more preferably 150 μm. By setting the thickness of the adhesive layer within the above range, the excellent adhesive property can be maintained based on the unevenness of the surface of the adherend, and the adhesive layer can be properly used for a use required for thinning.

By using the UV curable composition of the present invention, a sheet having a thin and uniform structure can be well produced compared to thermal curing. Due to high mechanical strength, high flexibility, the obtained thin UV curable sheet can be properly used as an adhesive sheet, a stretchable sheet and the like.

Next, the preparation method of the UV curable sheet of the present invention will be described.

The UV curable composition of the present invention is dissolved or dispersed into a solvent to prepare a coating liquid for forming the adhesive layer (hereinafter referred to as the coating liquid). The concentration of the solid component of the coating liquid is preferably set as 10 mass %-90 mass %, more preferably 20 mass %-60 mass %. When the release film is used, the coating liquid is coated on the surface of the release film and then dried to form a film or a sheet, and peeling is conducted from the release film to obtain the UV curable sheet only containing the adhesive layer. Moreover, when the substrate is used, the coating liquid is coated on the single side or two sides of the substrate and then dried to obtain the UV curable sheet.

The coating method of the coating liquid is not especially limited, and can adopt a wire bar, an applicator, a brush, a sprayer, a roller, a gravure coater, a die coater, a lip coater, a comma coater, a knife coater, a reverse coater, a spin coater and other known methods. It is noted that the surface of the release film coated with the coating liquid or the surface of the substrate can also be subjected to surface treatment in advance as needed.

The drying method of the coating liquid is not specially limited, and can adopt conventional methods such as hot air drying and reduced pressure drying can be used. Drying conditions can be appropriately set according to the types of the UV curable compositions, the types of solvents used in preparation of the coating liquid, the film thickness of the adhesive layer and the like. Usually, drying is performed for 1 min-10 min at 60° C.-130° C.

As long as UV irradiation is conducted, the UV curable sheet of the present invention can be used as a general adhesive sheet. Specifically, the UV curable sheet can be used as adhesive sheet for adhesion between materials with different linear expansion coefficients (CTE), adhesive sheets with reworkability, anisotropic conductive adhesive sheets, exothermic adhesive sheets, stretchable adhesive sheets capable of following the expansion and contraction of materials, alternative to silicone-based or urethane-based adhesive sheets and adhesive sheets with vibration durability.

The obtained UV curable sheet is irradiated by UV, so that the rubber components having the diene skeletons are cross-linked to obtain the cured product. UV irradiation can be performed by a high pressure mercury lamp, a molten (Fusion) H lamp, a xenon lamp, a metal halide lamp, a UV-LED lamp and the like. Preferably, the cumulative light amount is about 300-3,000 mJ/cm$^2$.

For the UV curable sheet in which the adhesive layer is provided on the surface of the substrate, an adhesive layer side or a substrate side can be irradiated by UV. However, when the substrate side is irradiated, the substrate must be UV-permeable.

Gel Fraction of Cured Product

The gel fraction of the obtained cured product is preferably 50%-100%, more preferably 50%-95%. If the gel fraction is 50% or more, high mechanical strength can be obtained. If the gel fraction is 95% or less, the higher stretchability can be obtained. It is noted that the gel fraction can exceed 95%, however, at this case the cured product becomes too hard, and possibly cannot be applied to some uses. The gel fraction is measured according to the following method.

The UV curable sheet only containing the adhesive layer having a predetermined thickness is cured by irradiation of UV with a cumulative light amount of 1,600 mJ/cm² at room temperature through a high-pressure mercury lamp, and then a test sheet with a size of 30 mm×30 mm is fabricated. The test sheet is embedded into a polyester mesh [mass (A gram)] to measure mass (B g). Subsequently, the test sheet is immersed in 100 mL of toluene and placed for 96 h or more at room temperature. After that, the test sheet with the mesh is taken out, washed with toluene and dried for 3 h at 120° C. The mass (C g) after drying is measured, and the gel fraction is calculated by the following formula.

Gel fraction(mass %)=[(C-A)/(B-A)]×100

Peel Strength of UV Curable Sheet

The 90-degree peel strength of the UV curable sheet of the present invention is preferably 4 N/inch or more, further preferably 7 N/inch or more, and further preferably 10 N/inch or more. The 90-degree peel strength of the UV curable sheet is measured according to the following method.

A PET substrate with a thickness of 50 μm and a stainless steel (SUS304, thickness 1.5 mm) subjected to bright surface annealing are used as adherends. The UV curable sheet only containing the adhesive layer with a predetermined thickness is sandwiched between the above-mentioned adherends, and then bonded by a hand roller (manual roll), and irradiated by UV with a cumulative light amount of 1600 mJ UV/cm² from the PET substrate side by using a high-pressure mercury lamp at room temperature to be cured as a test sheet. The 90-degree peel strength of the test sheet on stainless steel is measured at a tensile speed of 50 mm/min (mm/min) in accordance with JIS K-6854. A universal testing machine #5982 manufactured by Instron Corporation is used for measurement.

Mechanical Strength of UV Curable Sheet

In the present invention, the mechanical strength is evaluated by the following method.

After the UV curable sheet only containing the adhesive layer with the predetermined thickness is irradiated by UV with a cumulative light amount of 1600 mJ UV/cm² at room temperature to be cured, the tensile strength (MPa) at cutting and elongation (%) at break are measured according to JIS. K-6251, except that the size of the test sheet is changed into 10 mm×150 mm. It is noted that the tensile speed is set as 500 mm/min.

The tensile strength at cutting of the UV curable sheet of the present invention after being cured is preferably 2 Mpa or more, further preferably 3 MPa or more.

The elongation at break of the UV curable sheet of the present invention after being cured is preferably 200% or more, further preferably 300% or more.

It is noted that the UV curable sheet of the present invention is characterized in that the tensile strength at cutting is high after curing even if the sheet is thin. Specifically, it can be seen that the elongation at break of all of the UV curable sheets having a thicknesses of 25 μm, 50 μm, and 100 μm based on JISK-6251 after being irradiated by UV with a cumulative light amount of 1,600 mJ/cm² at room temperature through a high-pressure mercury lamp is shown as a value of 3.5 MPa or more.

On the other hand, when the thickness of the thermosetting adhesive sheet is thick, the tensile strength at cutting shows a high value, but if the thickness of the sheet is thinner, the tensile strength at cutting is sharply lowered. Therefore, 3.5 MPa or more of the tensile strength at cutting of the thermosetting adhesive sheet having a thickness of 25 μm-50 μm cannot be achieved. In contrast, the UV curable sheet of the present invention has a tensile strength at cutting of 3.5 MPa or more within a sheet thickness of 25 μm-100 μm. Therefore, if the tensile strength at cutting of the cured product of the UV curable sheet having a thickness of 25 μm-100 μm measured by the above method is 3.5 MPa or more, it can be confirmed that the UV curable sheet is the sheet of the present invention.

EXAMPLES

The present invention will be further described in detail by the following examples, but is not limited thereto. It is noted that in examples, without special description, "%" and "part" represent mass % and mass part.

Components of UV Curable Composition (A) A rubber component with a diene skeleton
(A-1) Solid rubber component
(A-1-1) Styrene-butadiene rubber: (styrene content: 25%, Mooney viscosity ML1+4 (100° C.): 47)
(A-1-2) Styrene-butadiene rubber: (styrene content: 46%, Mooney viscosity ML1+4 (100° C.): 45)
(A-1-3) Butadiene rubber: (Mooney viscosity ML1+4 (100° C.): 45)
(A-2) Liquid rubber component
(A-2-1) Styrene•butadiene random copolymer: (1,2 vinyl (butadiene): 70%, styrene content: 25%, Mn: 4.5×1000)
(A-2-2) Maleic anhydride modified styrene-butadiene rubber: (Mn: 9.1×1000, acid value: 34 mgKOH/g)
(A-2-3) Maleic anhydride modified butadiene rubber: (Mn: 5.0×1000, acid value: 57 mg KOH/g)
(A-2-4) Carboxy group modified styrene-butadiene rubber: (dicarboxylic acid-modified styrene-butadiene rubber)
(A-2-5) Carboxy group modified styrene-butadiene rubber: (dicarboxylic acid monoester-modified styrene-butadiene rubber)
(A-2-6) Maleic anhydride modified isoprene rubber: (Mn: 34.0×1000, acid value: 9-11 mg KOH/g)
(A-2-7) Carboxy group modified isoprene rubber: (Mn: 30×1000, viscosity at 38° C.: 430 Pa·s (Pa·s))
(A-2-8) Epoxy group modified butadiene rubber: (Mn: 1000-2000, epoxy equivalent: 190-210 (g/eq, gram/equivalent))
(A-2-9) Hydroxyl group modified butadiene rubber: (Mn: 3.2×1000, hydroxyl value: 0.64 meq/g (milliequivalent/g))
(B) Photopolymerization initiator
(B-1) 1-hydroxycyclohexyl phenyl ketone
(B-2) 2,2-dimethoxy-1,2-diphenylethan-1-one
(B') Radical initiator consisting of an organic peroxide
(B'-1) Dicumyl peroxide
(C) Crosslinker
(C-1) Dipentaerythritol hexa-acrylate serving as one of polyester acrylates, with 6 ethylenically unsaturated groups
(C-2) Aromatic polyester acrylate with 2 ethylenically unsaturated groups
(C-3) Urethane acrylate with 10 ethylenically unsaturated groups (D) Tackifier (D-1) Aromatic modified terpene resin: YS Resin TO115 (prepared by Yasuhara Chemical Co., Ltd.)

(D-2) Alkylphenol modified xylene resin: NIKANOL GHP-150 (prepared by fudow Corporation)

It is noted that the above A-2-4 component is prepared by the following preparation method. The maleic anhydride modified styrene-butadiene rubber (component A-2-2, 25 g), and 10.3 g of toluene, 12.5 g of diglyme (diethylene glycol dimethyl ether) serving as a diluent solvent, and 2.7 g of pure water are put into an Erlenmeyer flask whose upper part is connected with an Allihn condenser, and stirred by a magnetic stirrer until the insoluble components of the resin cannot be confirmed. It is noted that the addition amount of the pure water is 10 times the amount of anhydride equivalent.

After that, a ring-opening reaction is performed for 7 h in a water bath of 95° C.

After the reaction, the diluent solvent and water are removed using a vacuum concentrator and a vacuum dryer to obtain the carboxy group modified styrene-butadiene rubber (A-2-4).

The infrared absorption spectrum of the obtained carboxy group modified styrene-butadiene rubber (A-2-4) is compared with the infrared absorption spectrum of the maleic anhydride modified styrene-butadiene rubber (A-2-2) before the reaction. The peak intensity of the absorption peak (1785 $cm^{-1}$) of the anhydride group in A-2-4 due to C=O stretching vibration is reduced compared with that in A-2-2. Further, the absorption peak (1710 $cm^{-1}$) of the carboxy group that is not confirmed in A-2-2 due to C=O stretching vibration is determined. As a result, the dicarboxylic acid modified rubber composition is obtained.

On the other hand, the above-mentioned A-2-5 component is prepared by the following preparation method.

The maleic anhydride modified styrene-butadiene rubber (A-2-2 component, 25 g), and 19.4 g of toluene serving as a diluting solvent and 7.0 g of ethanol are put into the Erlenmeyer flask whose upper part is connected with the Allihn condenser and stirred by the magnetic stirrer until the resin insoluble component cannot be confirmed. It is noted that the addition amount of ethanol is 10 times the amount of anhydride equivalent.

After that, the ring-opening reaction is performed for 7 h in a water bath of 95° C.

After the reaction, the diluent solvent and ethanol are removed using a vacuum concentrator and a vacuum dryer to obtain the carboxy group modified styrene-butadiene rubber (A-2-5).

The infrared absorption spectrum of the carboxy group modified styrene-butadiene rubber (A-2-5) is compared with the infrared absorption spectrum of the maleic anhydride modified styrene-butadiene rubber (A-2-2) before the reaction. The peak intensity of the absorption peak (1785 $cm^{-1}$) of the anhydride group in A-2-5 due to C=O stretching vibration is reduced compared with that in A-2-2. Further, the absorption peaks (1710 $cm^{-1}$ and 1740 $cm^{-1}$) of the carboxy group and ester group that are not determined in A-2-2 due to C=O stretching vibration are determined. As a result, the dicarboxylic acid monoester modified rubber composition is obtained.

Examples 1-16, Comparative Examples 1-2, and Reference Examples 1-4

Various components in mass ratios seen in Tables 1-4 are added into toluene to be mixed and stirred, and then defoamed under reduced pressure to obtain a coating liquid. The obtained coating liquid is coated on a release film (a PET film with a silicone release agent) using an applicator (coater). Here, the thickness of the dried adhesive layer is adjusted to the thickness described in Tables 1-4. After drying for 3 min at 120° C., the release film is peeled off to obtain the UV curable sheet.

Then, the UV curable sheets in examples 1-16 and comparative examples 1-2 are irradiated by UV with a cumulative light amount of 1600 $mJ/cm^2$ at room temperature through a high pressure mercury lamp to obtain the cured products. Table 1, Table 2, and Table 4 show measurement results of gel fractions, 90-degree peel strengths, tensile strengths at cutting and elongations at break of the obtained cured products by the above-mentioned methods. Table 3 shows the measurement results of the gel fraction and the 90-degree peel strength of the cured product.

It is noted that, as a reference, a composition in reference example 1 using an organic peroxide serving as a thermal radical initiator as a radical source is also prepared. In reference examples, the cured product is obtained by heating for 1 h at 180° C.

As shown in Table 1, in comparative example 1 where only the solid rubber component is included as a rubber component with a diene skeleton, the gel fraction of the obtained cured product is 72.8%, but the 90-degree peel strength is lower, being 1.1 N/inch. On the other hand, in comparative example 2 where only the liquid rubber component is included as the rubber component with the diene skeleton, the gel fraction of the obtained cured product is 5.0%, and the obtained cured product cannot be made into the sheet.

In contrast, in example 1, the gel fraction of the obtained cured product is 69.2%, which is about the same as that of comparative example 1, but the 90-degree peel strength greatly rises to 5.1 N/inch. Thus, the effect of the UV curable composition of the present invention containing a solid rubber component and a liquid rubber component as a rubber component with a diene skeleton is confirmed. By including the liquid rubber component as the rubber component, the fluidity of the UV curable composition is improved compared with that in comparative example 1 only including the solid rubber component. This is because the UV curable composition also enters the recess on the surface of the adherend, so as to obtain the anchoring effect.

It is noted that the gel fraction of the cured product in example 1 is about the same as that of the cured product prepared by thermal curing in reference example 1 (previous method). In addition, the cured product in example 1 has the mechanical strength similar to the cured product with a thickness of 100 µm obtained by thermal curing in reference example 1. That is, it is confirmed that the composition of example 1 has the mechanical strength required for the rubber composition. It is noted that reference example 1 requires heating at 180° C. The 90-degree peel strength cannot be measured because PET is used as the adherend.

On the other hand, in example 1, although PET is used as the adherend the 90-degree peel strength can be measured because the heating step is not required. Then, from the obtained value, it is also confirmed that the sheet of example 1 has the adhering force usually required as an adhesive sheet. Therefore, it is confirmed that the UV curable composition of the present invention can be cured without going through a high-temperature heating process, and has excellent adhesiveness (adhering force) and can be used with the adherend with poor heat resistance.

TABLE 1

|  |  |  | Example 1 | Comparative example 1 | Comparative example 2 | Reference example 1 |
|---|---|---|---|---|---|---|
| Composition | (A-1) Solid rubber component | (A-1-1) Styrene-butadiene rubber | 90 | 100 | — | 90 |
|  | (A-2) Liquid rubber component | (A-2-1) Styrene•butadiene random copolymer | 10 | — | 100 | 10 |
|  | (B) Photo polymerization initiator | (B-1) 1-hydroxy-cyclohexyl-phenyl ketone | 1 | 1 | 1 | — |
|  | (B') Radical initiator consisting of organic peroxide | (B'-1) Dicumyl peroxide | — | — | — | 0.05 |
|  | (C) Crosslinker | (C-1) Dipentaerythritol polyacrylate | 5 | 5 | 5 | 5 |
| Measurement•evaluation results | Thickness of adhesive layer (μm) |  | 100 | 100 | 100 | 100 |
|  | Gel fraction (%) |  | 69.2 | 72.8 | 5.0 | 74.4 |
|  | 90-degree peel strength (N/inch substrate: PET (50 μm) |  | 5.1 | 1.1 | — | — |
|  | Mechanical strength | Tensile strength at cutting (MPa) | 4.4 | 4.6 | — | 5.3 |
|  |  | Elongation at break (%) | 670 | 700 | — | 440 |

Table 2 shows the results obtained when various modified rubbers were used as liquid rubber component instead of (A-2-1) styrene•butadiene random copolymer of example 1. The specific modified rubbers are as follows: (A-2-2) maleic anhydride modified styrene-butadiene rubber (example 2), (A-2-3) maleic anhydride modified butadiene rubber (example 3), (A-2-4) carboxy modified styrene-butadiene rubber (water ring-opened product of A-2-2) (example 4) and (A-2-5) carboxy modified styrene-butadiene rubber (ethanol ring-opened product of A-2-2)) (example 5). It is found that compared with example 1, the adhering forces of examples 2, 3, 4 and 5 are further improved. It is considered that examples 2-5 also comprise the liquid rubber component. Therefore, the fluidity of the UV curable composition is improved compared to comparative example 1 only including the solid rubber component, and the UV curable composition also enters the recess of the adherend so as to obtain the anchoring effect.

Then, it is speculated that in examples 2-5 where the modified liquid rubber component into which functional groups are introduced is used, the adhering force is further improved due to interaction between the functional groups of the modified liquid rubber component and the polar functional groups on the surface of the adherend. Particularly, since the 90-degree peel strength of examples 4 and 5 where the carboxy group modified styrene-butadiene rubber is used is high, the modified rubber into which carboxy group is introduced is extremely effective. Here, example 2 and example 3 are both examples where maleic anhydride modified liquid rubbers are used. However the 90-degree peel strengths, tensile strengths at cutting and elongations at break of example 2 where the solid rubber component and the liquid rubber component are both styrene-butadiene rubbers show better results.

TABLE 2

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| UV curable composition | (A-1) Solid rubber component | (A-1-1) Styrene-butadiene rubber | 90 | 90 | 90 | 90 | 90 | 90 | 90 | — | — |
|  |  | (A-1-2) Styrene-butadiene rubber | — | — | — | — | — | — | — | 90 | — |
|  |  | (A-1-3) Butadiene rubber | — | — | — | — | — | — | — | — | 90 |
|  | (A-2) Liquid rubber component | (A-2-1) Styrene•butadiene random copolymer | 10 | — | — | — | — | — | — | — | — |
|  |  | (A-2-2) Maleic anhydride modified styrene-butadiene rubber | — | 10 | — | — | — | 10 | 10 | 10 | 10 |
|  |  | (A-2-3) Maleic anhydride modified butadiene rubber | — | — | 10 | — | — | — | — | — | — |
|  |  | (A-2-4) Carboxy group modified styrene-butadiene rubber | — | — | — | 10 | — | — | — | — | — |

TABLE 2-continued

|  |  |  | Example 1 | Example 2 | Example 3 | Example 4 | Example 5 | Example 6 | Example 7 | Example 8 | Example 9 |
|---|---|---|---|---|---|---|---|---|---|---|---|
|  |  | (A-2-5) Carboxy group modified styrene-butadiene rubber | — | — | — | — | 10 | — | — | — | — |
|  | (B) photopolymerization initiator | (B-1) 1-hydroxy-cyclohexyl-phenyl ketone | 1 | 1 | 1 | 1 | 1 | 1 | 1 | 1 | 1 |
|  | (C) Crosslinker | (C-1) Dipentaerythritol polyacrylate | 5 | 5 | 5 | 5 | 5 | 5 | 5 | 5 | 5 |
| Measurement/ evaluation results | Thickness of adhesive layer (μm) |  | 100 | 100 | 100 | 100 | 100 | 50 | 25 | 50 | 50 |
|  | Gel fraction (%) |  | 69.2 | 72.4 | 70.8 | 63.7 | 62.5 | 78.1 | 83.9 | 87.4 | 87 |
|  | 90-degree peel strength (N/inch substrate: PET (50 μm) |  | 5.1 | 11.1 | 7.4 | 28.1 | 18.9 | 10.5 | 6.5 | 6.8 | 11.1 |
|  | Mechanical strength | Tensile strength at cutting (MPa) | 4.4 | 3.9 | 3.4 | 3 | 3.1 | 4.1 | 4.1 | 6 | 2.9 |
|  |  | Elongation at break (%) | 670 | 470 | 400 | 430 | 490 | 370 | 330 | 360 | 540 |

Except that the thickness of the adhesive layer in example 2 is changed, the UV curable sheet and the cured product are prepared like example 1, as example 6 and example 7. Evaluation results will be described below.

(A-1-2) styrene-butadiene rubber or (A-1-3) butadiene rubber is used instead of (A-1-1) styrene-butadiene rubber as the solid rubber component in example 6. Moreover, the UV curable sheet and the cured product are prepared like example 1, as example 8 and example 9 respectively. From the evaluation results of the above-mentioned UV-curable sheet and cured product, it is confirmed that the effect of the present invention can also be obtained even if the above-mentioned solid rubber component is used.

In addition, (A-2-6) maleic anhydride modified isoprene rubber, (A-2-7) carboxy group modified isoprene rubber (A-2-8) epoxy modified butadiene rubber and (A-2-9) hydroxyl modified butadiene are respectively used instead of (A-2-2) maleic anhydride modified styrene-butadiene rubber as the modified liquid rubber component in example 2. Moreover, the UV curable sheet and the cured product are prepared like example 1. Although there is no description in tables, it is confirmed through the evaluation results of the above curable sheet and cured product that the effect of the present invention can also be obtained using the above liquid rubber component.

Further, although there is no description in tables, it is confirmed that the effect of the present invention can also be obtained by adding (D-1) aromatic modified terpene resin or (D-2) alkylphenol modified xylene resin as a tackifier.

(A-2-2) maleic anhydride-modified styrene-butadiene rubber serving as the modified rubber is used instead of (A-2-1) styrene-butadiene random copolymer as the liquid rubber component in reference example 1. Moreover, the thermal curable sheet and cured product are prepared like example 1, as reference example 2. The coating liquid in reference 2 is used to respectively set the thicknesses of the adhesive layer as 50 microns (reference example 3) and 25 microns (reference example 4) when being dried, so as to obtain the cured product. The relationship between the thicknesses and the tensile strengths at cutting of the above-mentioned examples (examples 2, 6 and 7) and reference examples (reference examples 2-4) is shown in FIG. 1. It is confirmed from FIG. 1 that the tensile strengths at cutting of the cured products in reference examples are reduced with the thinning of the thickness. In contrast, the cured product in example can obtain a certain tensile strength at cutting regardless of the thickness. Specifically, when the thickness is 100 μm, the tensile strength at cutting of the cured product in reference example 2 is 5.3 MPa. However, as the thickness is thinned from 50 μm (reference example 3) and 25 μm (reference example 4), the tensile strength at cutting is significantly reduced. In contrast, it is known that the cured products in examples 2, 6 and 7 do not depend on the thickness within the thickness range of 25 μm-100 μm, and the tensile strength at cutting is roughly maintained at 4 MPa. From the above results, it is confirmed that a UV curable sheet in which the thickness is 25 μm-100 μm and the tensile strength at cutting of the cured product is 3.5 Mpa or more can be obtained.

The reasons why the cured product having excellent mechanical strength can be obtained even though it is thin are as follows. In the thermosetting resin, as shown in reference examples 3-4, if the thickness of the sheet is thinned, an influence generated by heat convection between the solid rubber component and the liquid rubber component is remarkable. As a result, for example, the liquid rubber component is aggregated and crystallized, ununiform parts are locally generated, and fractures easily occur from the parts. On the other hand, in examples 2, 6, and 7 of the UV curable sheet, it is considered that heat convection between the solid rubber component and the liquid rubber component in the sheet is less likely to occur due to little heat generated when in UV irradiation, and local ununiform parts are difficult to form. Therefore, the sheet with high tensile strength at cutting can be obtained even though it is thin.

A rate of the solid rubber component to the liquid rubber component in example 2 is changed. Moreover, the UV curable compositions and the UV curable sheets are prepared by using a method same as that in example 1, as examples 10-13. Relative to the total amount of the rubber component with the diene skeleton, the contents of the liquid rubber components are 5 mass (example 10), 30 mass % (example 11), 50 mass % (example 12) and 70 mass % (example 13), respectively. Table 3 shows results of gel fraction and 90-degree peel strength of the cured product obtained by evaluation. As comparison, results of comparative example 1 are also showed. All the examples show high adhesiveness, and it is confirmed that an effect of comprising the solid rubber component and the liquid rubber component as the rubber component with the diene skeleton is obtained. In addition, it is known that in this example, the 90-degree peel strength rises with the increase of the content of the liquid rubber component, maximum is obtained near 30 mass % and then decreases with the increasing of the liquid rubber component.

TABLE 3

|  |  |  | Comparative example 1 | Example 10 | Example 2 | Example 11 | Example 12 | Example 13 |
|---|---|---|---|---|---|---|---|---|
| UV curable composition | (A-1) Solid rubber component | (A-1-1) Styrene-butadiene rubber | 100 | 95 | 90 | 70 | 50 | 30 |
|  | (A-2) Liquid rubber component | (A-2-2) Maleic anhydride modified styrene-butadiene rubber | 0 | 5 | 10 | 30 | 50 | 70 |
|  | (B) Photo polymerization initiator | (B-1) 1-hydroxy-cyclohexyl-phenyl ketone | 1 | 1 | 1 | 1 | 1 | 1 |
|  | (C) Crosslinker | (C-1) Dipentaerythritol polyacrylate | 5 | 5 | 5 | 5 | 5 | 5 |
| Measurement·evaluation results | Thickness of adhesive layer (μm) |  | 100 | 100 | 100 | 100 | 100 | 100 |
|  | Gel fraction (%) |  | 72.8 | 72.7 | 72.4 | 61.5 | 64.5 | 63.1 |
|  | 90-degree peel strength (N/inch substrate: PET (50 μm)) |  | 1.1 | 9 | 11.1 | 25.6 | 15 | 5.1 |

The photopolymerization initiator is changed from (B-1) 1-hydroxycyclohexylphenyl ketone to (B-2) 2,2-dimethoxy-1,2-diphenylethane-1-one. Moreover, the UV curable composition and the UV curable sheet are prepared in the same method as that in example 1, and evaluation results are shown in Table 4 (example 14). According to the above results, it is confirmed that excellent adhesiveness and mechanical strength are also shown even though 2,2-dimethoxy-1,2-diphenylethane-1-one is used as the photopolymerization initiator, and the effect of the present invention can be obtained.

The crosslinker is changed from (C-1) dipentaerythritol hexaacrylate to (C-2) aromatic polyester acrylate (example 15) and (C-3) Urethane acrylate (example 16). Moreover, the UV curable composition and the UV curable sheet are prepared in the same method as that in example 14, and evaluation results are shown in Table 4. According to the above results, it can be known that even if any crosslinker in example 14, example 15 and example 16 is used, the adhesiveness is improved and the excellent mechanical strength can be obtained.

According to the results in tables, it can be confirmed that if the number of ethylenically unsaturated groups is 2 or more, the excellent adhesiveness can be obtained. It also can be confirmed that although there is no description in tables, more excellent adhesiveness can be obtained by using the crosslinker having up to 15 ethylenically unsaturated groups.

TABLE 4

|  |  |  | Example 14 | Example 15 | Example 16 |
|---|---|---|---|---|---|
| UV curable composition | (A-1) Solid rubber component | (A-1-1) Styrene-butadiene rubber | 90 | 90 | 90 |
|  | (A-2) Liquid rubber component | (A-2-2) Maleic anhydride modified styrene-butadiene rubber | 10 | 10 | 10 |
|  | (B) Photo polymerization initiator | (B-2) 2,2-dimethoxy-1,2-diphenylethane-1-one | 1 | 1 | 1 |
|  | (C) Crosslinker | (C-1) Dipentaerythritol polyacrylate (the number of ethylenically unsaturated groups: 6) | 5 | — | — |
|  |  | (C-2) Aromatic polyester acrylate (the number of ethylenically unsaturated groups: 2) | — | 5 | — |
|  |  | (C-3) Urethane acrylate (the number of ethylenically unsaturated groups: 10) | — | — | 5 |
| Measurement · evaluation results | Thickness of adhesive layer (μm) |  | 100 | 100 | 100 |
|  | Gel fraction (%) |  | 63.1 | 79.4 | 71.8 |
|  | 90-degree peel strength (N/inch substrate: PET (50 μm)) |  | 12.3 | 10.4 | 9.8 |
|  | Mechanical strength | Tensile strength at cutting (MPa) | 3 | 3.2 | 3.1 |
|  |  | Elongation at breakage (%) | 440 | 610 | 590 |

What is claimed is:

1. A UV curable sheet comprising an adhesive layer, which is formed from a UV curable adhesive composition comprising
a rubber component with a diene skeleton, a photopolymerization initiator and a crosslinker,
wherein the rubber component with the diene skeleton comprises a solid rubber component and a liquid rubber component at 25° C.,
the liquid rubber component contains a modified styrene-butadiene rubber, the modified styrene-butadiene rubber is a rubber modified with at least one selected from the group consisting of a carboxy group and an acid anhydride group, and
the crosslinker is a multi-functional (meth)acrylate,
wherein when a thickness of the sheet is 100 μm, a 90-degree peel strength based on JISK-6854 after irradiation of UV with a cumulative light amount of 1600 mJ/cm$^2$ through a high-pressure mercury lamp at room temperature is 10 N/inch or more.

2. The UV curable sheet according to claim 1, wherein a blending amount of the liquid rubber is 3-50 mass % relative to a total amount of the rubber component.

3. The UV curable sheet according to claim 1, wherein the solid rubber component comprises at least one selected from a butadiene rubber and a styrene-butadiene rubber.

4. The UV curable sheet according to claim 1, wherein a thickness of the adhesive layer is 5-200 μm.

5. A cured product of the UV curable sheet according to claim 1.

6. The UV curable sheet according to claim 1, wherein when a thickness of the sheet is 25 μm-50 μm, a tensile strength at cutting based on JISK-6251 after irradiation of UV with a cumulative light amount is 1600 mJ/cm$^2$ through a high-pressure mercury lamp at room temperature is 3.5 MPa or more.

7. A cured product of the UV curable sheet according to claim 4.

8. The cured product according to claim 5, wherein a gel fraction of the cured product is 50% or more.

9. The UV curable sheet according to claim 1, wherein the crosslinker is a multi-functional (meth)acrylate having 2 or more and 15 or less ethylenically unsaturated groups.

10. The UV curable sheet according to claim 1, wherein a blending amount of the liquid rubber is 10 mass % or more relative to a total amount of the rubber component.

* * * * *